US007341404B2

(12) United States Patent
Tjader

(10) Patent No.: US 7,341,404 B2
(45) Date of Patent: Mar. 11, 2008

(54) DUAL CAPSTAN PULLER AND METHOD

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 89 days.

(21) Appl. No.: 11/215,316

(22) Filed: Aug. 29, 2005

(65) Prior Publication Data

US 2006/0056919 A1 Mar. 16, 2006

Related U.S. Application Data

(60) Provisional application No. 60/605,623, filed on Aug. 30, 2004.

(51) Int. Cl.
*F16L 55/18* (2006.01)

(52) U.S. Cl. ...................... 405/184.3; 405/156; 138/97

(58) Field of Classification Search ............. 405/184.3, 405/184.1, 156, 184; 138/97
See application file for complete search history.

(56) References Cited

U.S. PATENT DOCUMENTS 5,174,686 A * 12/1992 Raymond ................... 405/184
5,544,977 A * 8/1996 Cravy et al. ............. 405/184.3
6,672,802 B2 * 1/2004 Putnam ...................... 405/184
6,854,932 B2 * 2/2005 Putnam .................. 405/184.3
7,025,536 B2 * 4/2006 Putnam .................. 405/184.3
7,156,585 B2 * 1/2007 Wang et al. ............. 405/184.1
7,175,367 B2 * 2/2007 Hau ........................ 405/184.3
2005/0179017 A1 * 8/2005 Wang et al. ........ 254/134.3 FT

* cited by examiner

*Primary Examiner*—Frederick L. Lagman
(74) *Attorney, Agent, or Firm*—Schwegman, Lundberg and Woessner, P.A.

(57) ABSTRACT

A puller is provided with a number of advantages. Pullers are described that have a high power to weight ratio, and a high power to volume ratio. Examples of pullers and pulling systems include harmonic drive gear reduction elements and configurations that provide high cable friction in a small device volume. Examples of pullers and pulling systems also include constant force pulling which is desirable in particular for small diameter pipe replacement. Using pullers and pulling systems as described, minimally invasive pipe replacement operations are possible. Reversible pullers are also provided that decrease the amount of time needed to burst or split multiple segments of pipe.

9 Claims, 5 Drawing Sheets

110
130
144
100
400
140
150
410
422
310
420
430
402
404

DUAL CAPSTAN PULLER AND METHOD

RELATED APPLICATION

This application claims the benefit of U.S. Provisional Application No. 60/605,623 filed on Aug. 30, 2004, which application is incorporated herein by reference.

TECHNICAL FIELD

This invention relates to pulling equipment. Specifically, this invention relates to pulling equipment for use in trenchless pipe replacement.

BACKGROUND

Pipe materials such as cast iron, ductile iron, copper, etc. have been used for connecting homes and creating networks for utilities such as water, sewer, or gas, etc. For any number of reasons, an existing pipe may crack or break, necessitating replacement of the pipe.

Trenchless pipe replacement is a currently known technique that replaces underground pipe without the need to dig up the pipe to be replaced. A pipe breaking device such as an expander, burster, cutter, etc. is pulled or pushed through the existing pipe while it is still underground. The pipe breaking device is designed to break or cut the pipe, and at the same time to expand the old pipe into the surrounding soil. The expansion of the old pipe allows the pipe breaking device to concurrently pull a replacement pipe into place.

Trenchless pipe replacement has typically been employed on large diameter pipe such as water or sewer main lines. Due to the size of pipe in these types of replacements, the equipment used for pulling or pushing the expander through the pipe requires a great deal of force. As a result, common equipment in the industry for pulling or pushing the expander is relatively large and expensive such as an above ground winch and pulley system. These larger scale methods also commonly require a large access pit to be excavated on at least one end of the pipe to be replaced.

More recently, the technique of trenchless pipe replacement has been employed for smaller diameter pipe such as for lateral lines and even individual line service to homes such as copper lines. Improved devices and methods for replacement of these smaller diameter lines are needed as the industry expands. Some goals for device and method improvement include lower cost, light weight/portable device designs, and small entry and exit pits.

SUMMARY

Figure 1:
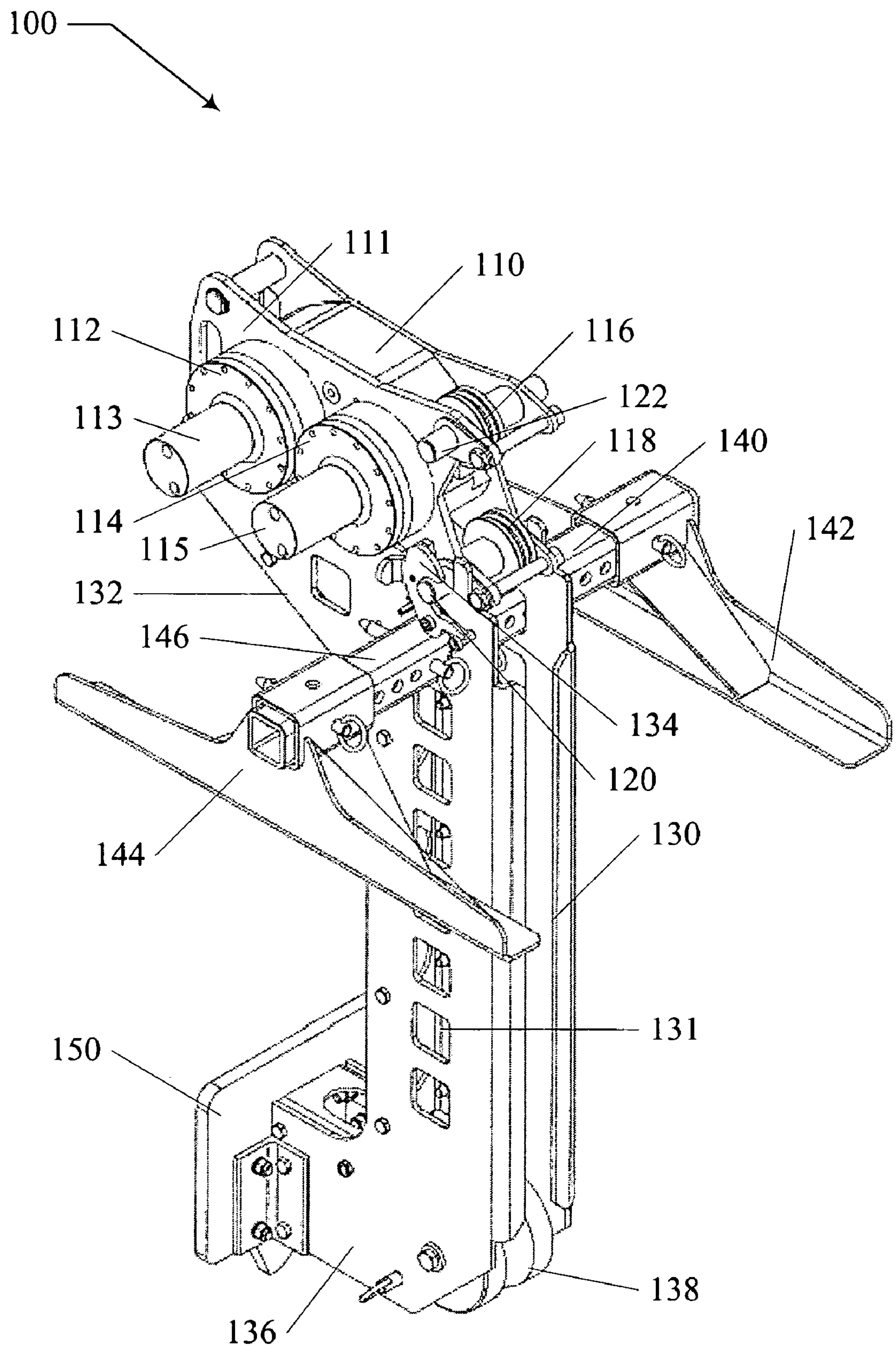
FIG. 1 shows an isometric view of a puller system according to an embodiment of the invention.

The above mentioned problems such as low cost, light weight puller devices and systems adapted for use with small exit and entry pits are addressed by the present invention and will be understood by reading and studying the following specification.

A method of pipe replacement is provided. The method includes inserting a flexible line through an exiting pipe and attaching a bursting tool to a distal end of the flexible line. The method also includes coupling a proximal end of the flexible line to a pulling device. Coupling to the pulling device includes routing the flexible line around at least one drum, and rotating the drum to pull the bursting tool through the exiting pipe. Rotating the drum includes powering a harmonic drive gear reduction coupled to the drum.

A pulling system is provided. The pulling system includes a guide boom and a surface support platform adjustably coupled along the guide boom. The pulling system also includes a pulling device with a puller body. The pulling device includes a harmonic drive gear reduction with a drive motor coupled to an input of the harmonic drive gear reduction, and a drum coupled to an output of the harmonic drive gear reduction.

A puller is provided. The puller includes a puller body and a plurality of harmonic drive gear reductions coupled to the puller body. The puller also includes a plurality of drive motors coupled to inputs of the harmonic drive gear reductions. The puller also includes a plurality of drums coupled to outputs of the harmonic drive gear reductions. Each drum includes a friction surface for contacting multiple windings of a single flexible line.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention. In the following detailed description, the term flexible line, or cable includes wire rope, and cables or ropes made from a number of materials including steel. Although an operation of pipe replacement is discussed at length in examples below, elements of the invention can be used in other applications and industries. Some aspects of the invention are therefore not limited to pipe replacement.

FIG. 1 shows a puller system 100 according to an embodiment of the invention. A puller 110 is shown. A guide boom 130 is shown with a top end 132 and a bottom end 136. In one embodiment, a backing plate 150 is coupled to the bottom end 136 of the guide boom 130. In one embodiment, the puller 110 is attached to the top end 132 of the guide boom 130 using an engaging feature 120 such as a protruding pin. In one embodiment, a releasable capture device 120 is used to accept and hold the engaging feature 120. Releasable capture devices 120 include, but are not limited to levers, clasps, other mechanical devices, electro-mechanical devices, etc. In one embodiment, the puller 110 includes a second engaging feature 122 located on an opposite side of the puller 110. Embodiments including a second engaging feature 122 allow the puller 110 to be mounted to the guide boom 130 in either of two opposite orientations. Some advantages of this feature will be discussed in embodiments below.

In one embodiment, the puller 110 includes a first drive motor 113. In one embodiment, the first drive motor 113 includes a hydraulic drive motor. Other drive motors include, but are not limited to servo motors, or other electrical motors. In one embodiment, the first drive motor 113 is coupled to a harmonic drive gear reduction 112, which is in turn coupled to a body 111 of the puller 110. In one embodiment, the puller 110 further includes a second drive motor 115 coupled to a second harmonic drive gear reduction 114. Although FIG. 1 shows two drive motors and two drive gear reductions, the invention is not so limited.

A first guide wheel 116 is shown on one end of the puller. In one embodiment the puller 110 includes a second guide wheel 118. In one embodiment, either the first guide wheel 116 or the second guide wheel 118 is used in a pulling operation, depending on the selected orientation of the puller 110. In one embodiment, a pulley 138 is included at the bottom end 136 of the guide boom 130 to redirect a flexible line that is being pulled by the puller 110.

In one embodiment the pulling system 100 includes a surface support device 140. FIG. 1 shows a cross bar 146 passing through one of an array of openings 131 in the guide boom. The cross bar 146 is held in place using a number of pins as shown, or other suitable fasteners. In one embodiment a first shoe 142 and a second shoe 144 are secured on ends of the cross bar 146. The first shoe 142 and the second shoe 144, similar to the cross bar itself, are held in place using a number of pins, or other suitable fasteners.

Using the array of openings 131, a height of the cross bar 146, is adjustable relative to the bottom 136 of the guide boom 130. Although an array of openings 131 in combination with a cross bar 146 is shown as one design providing height adjustment, the invention is not so limited. Other height adjustment mechanisms are possible, such as bolted fittings, cam lock fittings, other mechanical devices, etc. Advantages of the array of openings 131 and cross bar 146 embodiment include ease of assembly/disassembly and low manufacturing cost. Although a specific embodiment of a surface support device 140 is shown, the invention is not so limited. For example, fewer, or more than two shoes may be included in alternate surface support devices 140. Other devices that provide support against a surface such as ground that surrounds a hole will be apparent to one of ordinary skill in the art, having the benefit of the present disclosure.

In one method of operation, the pulling system 100 is used to pull a length of flexible line. Examples of flexible line include, but are not limited to, rope, steel cable, wire rope, etc. In one embodiment, the flexible line includes ¼ inch diameter steel cable.

Figure 2:
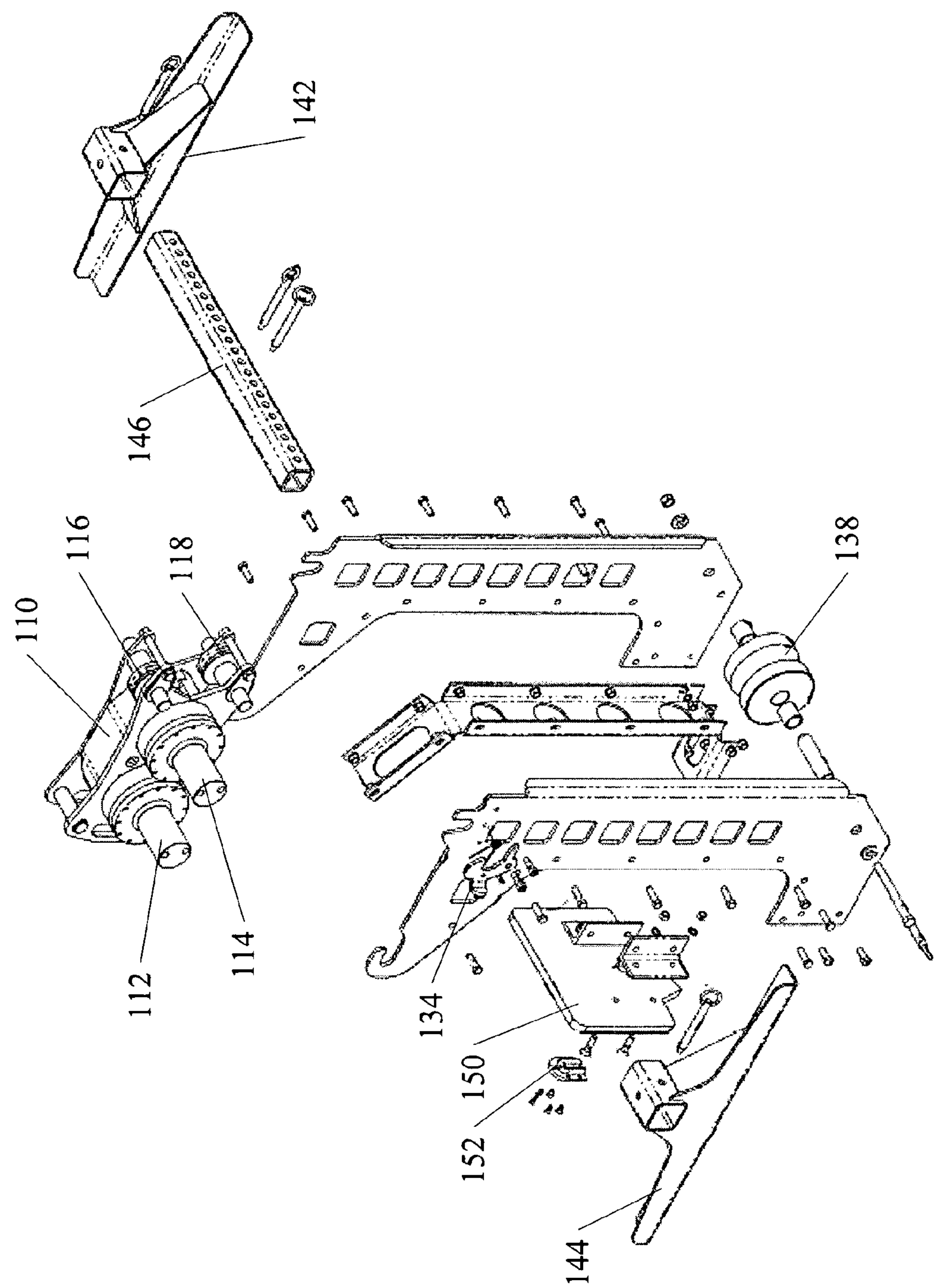
FIG. 2 shows an exploded view of a puller system according to an embodiment of the invention.

FIG. 2 shows an embodiment of a pulling system 100 in an exploded view. The particular embodiment shown illustrates one possible construction including features such as bolts and nuts to assembly the guide boom 130. FIG. 2 is included to show further detail of one possible pulling system.

Figure 3:
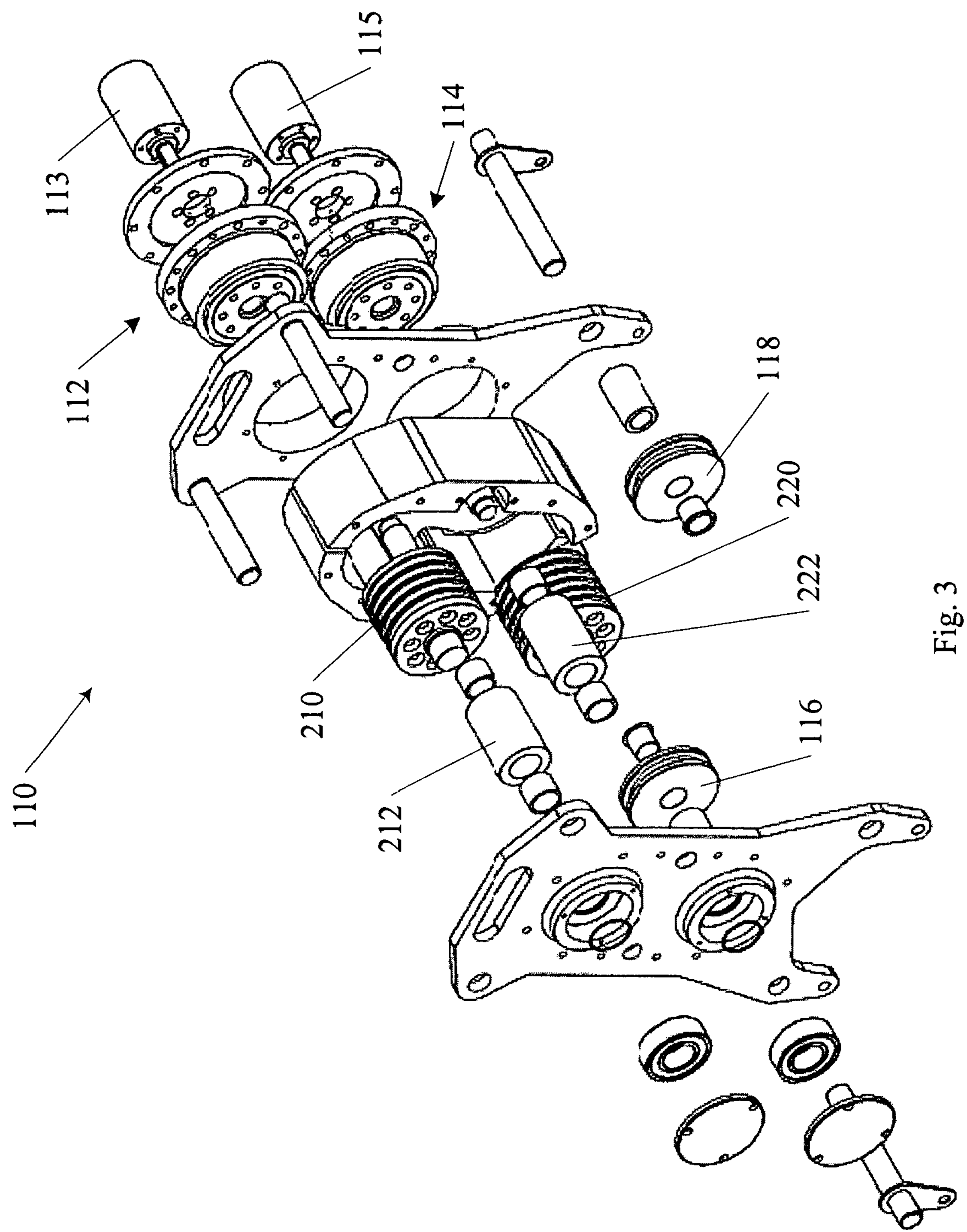
FIG. 3 shows an exploded view of a puller according to an embodiment of the invention.

As discussed in the background above, it is desirable to provide a puller and puller system that is lightweight, easy to transport in a small vehicle such as a pickup truck, etc., and easy for a small work crew to assemble and use. FIG. 3 shows an exploded view of a puller 110 according to an embodiment of the invention. A first drum 210 is shown for coupling to the first harmonic drive gear reduction 112. A second drum 220 is shown for coupling to the second harmonic drive gear reduction 114. In one embodiment, the drums include a friction surface that includes space for multiple windings of a cable or other flexible line. Advantages of multiple winding embodiments are discussed in more detail below. In one embodiment, a first deflecting roller 212 and a second deflecting roller 222 are included. Deflecting rollers adjust a path of a cable when the puller is in use. Advantages of embodiments using deflecting rollers are discussed in more detail below. The puller 110 is lightweight and easy to transport, and also highly powerful, reliable and easy to operate. The first drive motor 113 is shown in relation to the first harmonic drive gear reduction 112, which is shown in an exploded view.

Use of a harmonic drive gear reduction provides a number of advantages. One advantage includes a large mechanical advantage with very little weight in the device. In one embodiment, a mechanical advantage from the harmonic drive gear reduction is approximately 200 to 1. Another advantage of a harmonic drive gear reduction includes a small number of moving parts which in turn provides a reliable device with fewer parts that could possibly fail during use. Another advantage of a harmonic drive gear reduction includes a high number of teeth operatively in contact between an input and output of the harmonic drive gear reduction. The large number of teeth in contact provides a high strength to weight ratio of the harmonic drive gear reduction.

Pullers and systems using pullers as described above can be made very lightweight and portable. In one embodiment, a puller system weighs less than 65 lbs. and can be disassembled into a number of component parts. Even a single user is therefore easily able to move such a puller or puller system in a small vehicle such as a pickup truck to a job site and assemble the puller system.

As discussed in the background above, there is a need for improved pullers and systems for small diameter pipe replacement. In one embodiment, pullers and systems described above are adapted for use with pipe as small as ½" to 1" pipe. Examples of pipe that are suitable for pullers and systems described above include, but are not limited to, iron pipe and copper pipe. In one embodiment, a small cable is necessary to replace such small diameter pipe. In one embodiment a ¼" cable is used.

When using small diameter cable to burst or split an existing pipe, one factor to be taken into account in puller designs is that the forces needed for bursting or splitting are close to a tensile strength of many possible cable choices. In one embodiment, a constant pulling force provided by a puller is desirable in contrast to cyclic tugging because the tensile strength of the cable is less likely to be exceeded. Constant pulling tends to keep a bursting or cutting head moving and thus subject to sliding friction within the pipe to be replaced. In contrast, tugging tends to include several stops and starts on the bursting or cutting head. Generally starting friction is higher than sliding friction, thus constant force pulling provides a lower and more consistent bursting or cutting operation. Design features such as a harmonic drive gear reduction and other features described below provide a high power, constant pulling force, and in addition provide low overall device weight.

Figure 4:
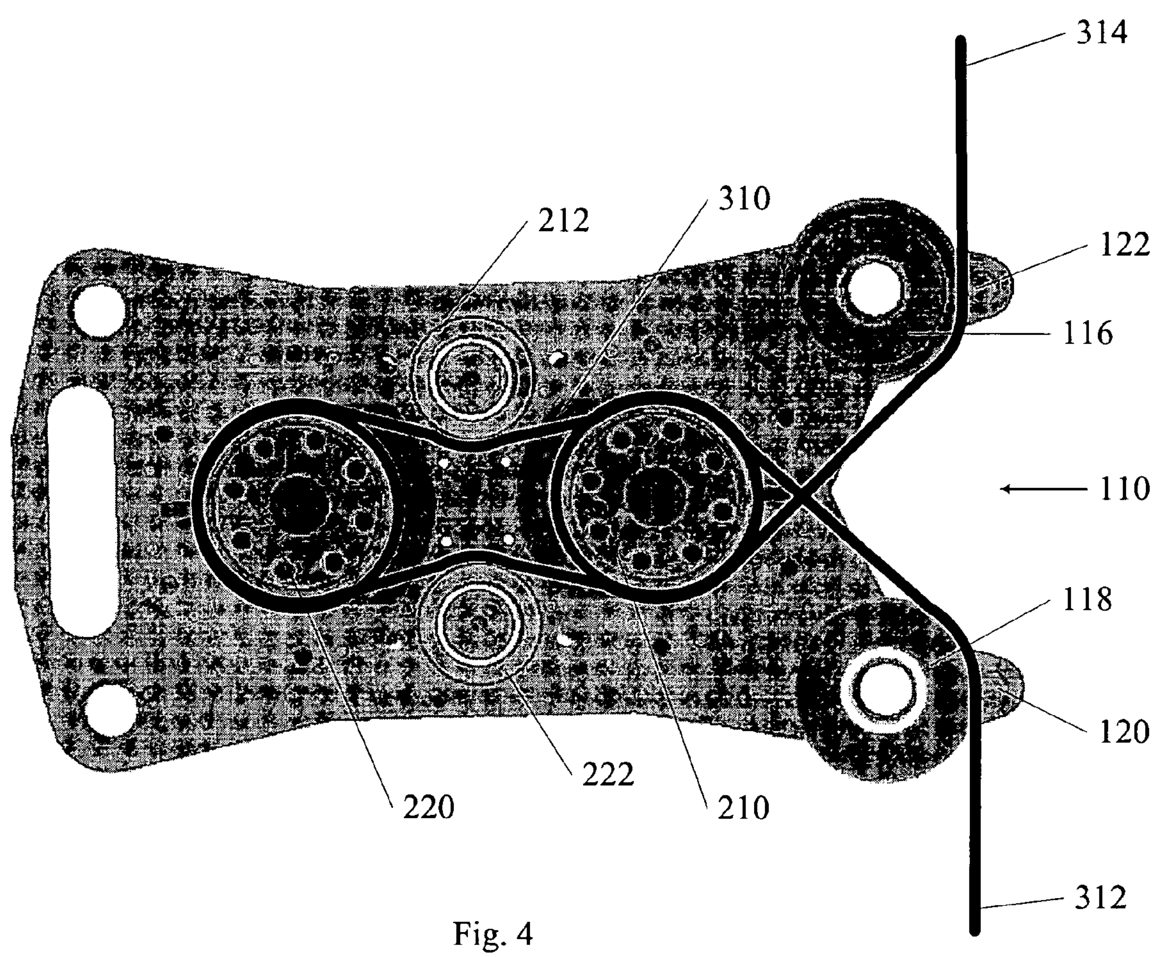
FIG. 4 shows a side cross section view of a puller according to an embodiment of the invention.

FIG. 4 shows a cross section of a puller 110 according to an embodiment of the invention with a cable 310 or other flexible line routed through the puller 110. A first end 312 and a second end 314 of the cable 310 are shown at entry/exit locations of the puller 110. In one embodiment, the puller 110 is reversible, therefore the first end 312 or the second end 314 could be used as either an entry or exit location of the puller 110 depending on the direction of puller operation.

In one embodiment, the cable 310 wraps around multiple driven drums within the puller 110. When high pulling forces are needed to burst or cut a pipe, equally high reaction forces such as friction forces are needed within the puller 110. Multiple drums provide a higher friction surface area, and thus a higher friction advantage acting on the cable 310. Although two drums (first drum 210 and second drum 220) are shown in FIG. 4, a single drum embodiment is also within the scope of the invention, and embodiments with more than two drums are also within the scope of the invention.

In one embodiment each drum is adapted to accept multiple windings of the cable 310. As discussed above, high friction is desirable to provide high pulling forces for bursting or cutting. In one embodiment, five or more windings are used on a drum to increase friction. Although the cable contacting surfaces of the drums can be flat, in one embodiment, cable grooves are formed into the drums. Grooves further increase contact surface area that in turn increases friction with the cable.

In one embodiment at least one deflecting roller is included in the puller 110. The embodiment shown in FIG. 4 includes a first deflecting roller 212 and a second deflecting roller 222. Although two deflecting rollers are shown, a single deflecting roller or more than two deflecting rollers are also within the scope of the invention. Deflecting rollers further provide increased friction of the drums with the cable 310. As shown by the cable routing in FIG. 4, the use of deflecting rollers routes the cable 310 over more of the surface of the first drum 210 and the second drum 220 thus increasing contact surface area that in turn increases friction with the cable.

High pulling forces are thus provided with a constant force, in contrast to a tugging force. High amounts of friction are provided using designs described above in a small device that is light weight. Devices as described above therefore have a high power to puller weight ratio, and a high power to puller volume ratio.

Figure 5:
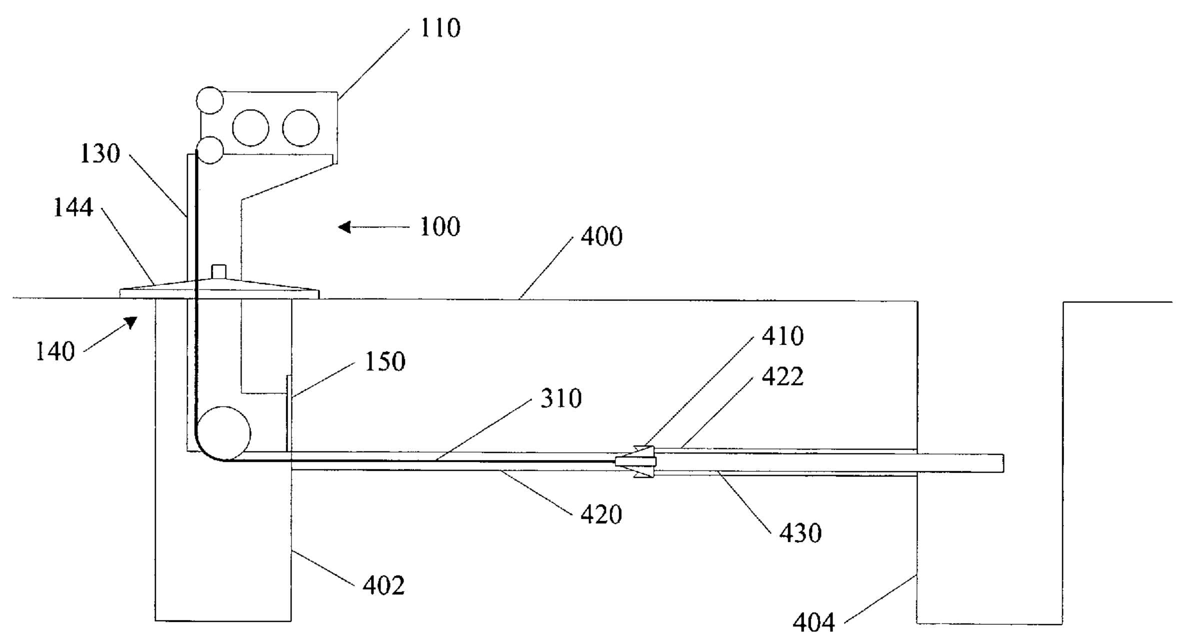
FIG. 5 shows a side view of a puller system in operation according to an embodiment of the invention.

FIG. 5 shows one example of a pipe bursting or cutting operation using pulling systems, devices, and components as described above. A pulling system 100 is shown including a surface support device 140. A shoe 144 similar to embodiments described above is shown in contact with the ground surface 400. In one embodiment the surface 400 includes a paved roadway. A first pit 402 and a second pit 404 are shown for exit and entry of a replacement pipe 430. An existing pipe 420 is shown in place with a bursting head 410 partially through a bursting operation. A section of burst pipe 422 is shown behind the bursting head 410 with the replacement pipe 430 being pulled in behind. FIG. 5 shows a bursting heat 410 that is adapted to split a ductile pipe in addition to expanding the pipe into the surrounding soil, however the invention is not so limited. A cable 310 is coupled to the bursting head 410. The cable 310 is being pulled by the pulling system 100 through the existing pipe 420.

It is desirable when replacing a pipe to cause minimal damage to existing surfaces such as roadways. In one embodiment, pullers and puller systems as described above are capable of pipe replacement using a substantially smaller pit 402. FIG. 5 shows the puller 110 located above the surface 400, instead of within the pit 402. Features of the system 100 such as the guide boom 130 allow the puller 110 to be located outside the pit 402. Because the pit 402 does not need to accommodate the puller 110, the pit size can be substantially reduced.

The adjustability of the surface support device 140 allows the pulling system 100 to work with existing pipes 420 at a variety of depths below the surface 400. The backing plate 150 is also shown providing a reaction force against a side of the pit 402. No work is required within the pit 402, such as assembling additional support structure for a separate pulley, etc. The pit 402 need only be large enough to accommodate the guide boom 130, therefore the size of the pit 402 need not be large enough for a worker. Because the pit 402 can be very small when using pullers and systems described above, the resulting patch in the surface 400 once pipe replacement is complete is small.

In one embodiment, the pit 402 is formed in a paved roadway. Because the pit is small, higher quality patch materials can be used economically. One commonly used term for projects where small pits are used is keyhole projects. As discussed, keyhole projects are desirable because high quality patch materials can be used economically. In one method, epoxy based patch materials are used to patch pits in paved roadways, and the resulting high quality patches do not wear out and cause uneven roadways after pipe replacement.

As discussed above, in one embodiment, the puller 110 is reversible. Features such as the first guide wheel 116 and the second guide wheel 118 as shown in FIG. 4 along with other design features such as symmetry allow the puller to be flipped over on the guide boom 130. One advantage of a reversible puller 110 includes a time savings in bursting or cutting operations. After a cable 310 is pulled through an existing pipe 420 to complete an operation, the end of the cable can be reinserted into the next segment of existing pipe to be replaced without reversing the cable 310 all the way through the puller 110. There is no need to re-thread the cable over the drums of the puller 110. In reversible embodiments, the puller 110 is simply flipped on the guide boom 130, and the cable is routed over either the first guide wheel 116 or the second guide wheel 118, whichever is on the bottom of the puller 110 after flipping. The puller 110 is then operated with the drive motors in the reverse direction. This process can be repeated as many times as necessary to burst or split several consecutive segments of pipe.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A method of pipe replacement, comprising:

inserting a flexible line through an existing pipe;

attaching a bursting tool to a distal end of the flexible line;

coupling a proximal end of the flexible line to a pulling device, including:

routing the flexible line around at least one drum; and rotating the drum to pull the bursting tool through the existing pipe, wherein rotating the drum includes powering a harmonic drive gear reduction coupled to the drum.

2. The method of claim 1, wherein powering the harmonic drive gear reduction includes powering with a hydraulic motor.

3. The method of claim 1, wherein routing the flexible line around at least one drum includes routing the flexible line around a pair of drums.

4. The method of claim 1, further including routing the flexible line around at least one deflecting roller to increase an amount of contact of the flexible line with the drum.

5. A method of pipe replacement, comprising:

inserting a flexible line through an existing pipe;

attaching a bursting tool to a first end of the flexible line;

rotating at least one drum in a drum assembly to pull the flexible line from a second end towards the first end of the flexible line to pull the bursting tool through the existing pipe;

detaching the bursting tool from the first end of the flexible line;

inserting the second end of the flexible line through a second existing pipe;

attaching the bursting tool to the second end of the flexible line;

flipping the drum assembly; and rotating the drum in reverse to pull the flexible line from the first end towards the second end of the flexible line to pull the bursting tool through the second existing pipe.

6. The method of claim 5, wherein rotating at least one drum includes powering a harmonic drive gear reductions to rotate the drum.

7. The method of claim 5, wherein rotating at least one drum includes powering a pair of harmonic drive gear reduction to rotate a pair of drums.

8. A method of pipe replacement, comprising:

lowering a boom through a hole in a section of pavement wherein the hole is sized to fit closely around the boom;

adjusting one or more surface support devices to determine a boom depth below the pavement;

inserting a flexible line around a pulley at an end of the boom, and further inserting the flexible line through an existing pipe;

attaching a bursting tool to a distal end of the flexible line;

powering a harmonic drive gear reduction to rotate a drum at a proximal end of the flexible line to pull the bursting tool through the existing pipe.

9. The method of claim 8, further including patching the hole after a bursting and pipe replacement operation are complete, wherein patching the hole includes patching with an epoxy based patch material.

* * * * *